United States Patent
Sacheti et al.

(10) Patent No.: US 12,182,148 B2
(45) Date of Patent: Dec. 31, 2024

(54) COMPUTER-IMPLEMENTED TABLE CONSTRUCTION

(71) Applicant: Microsoft Technology Licensing, LLC, Redmond, WA (US)

(72) Inventors: Arun Kumar Sacheti, Sammamish, WA (US); Parthasarathy Govindarajen, Sammamish, CA (US); Marcelo Medeiros De Barros, Redmond, WA (US); Yucan Zhang, Bothell, WA (US); Sharada Chandrasekaran, Fremont, WA (US); Sumit Chatterjee, Hyderabad (IN); Aditya Khandelwal, Pune (IN); Achraf AbdelMoneim Chalabi, Cairo (EG)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/325,529

(22) Filed: May 30, 2023

(65) Prior Publication Data

US 2024/0354309 A1    Oct. 24, 2024

(30) Foreign Application Priority Data

Apr. 24, 2023 (IN) .............................. 202311029408

(51) Int. Cl.
| | |
|---|---|
| G06F 16/248 | (2019.01) |
| G06F 16/23 | (2019.01) |
| G06F 16/242 | (2019.01) |
| G06F 16/2453 | (2019.01) |
| G06F 16/2455 | (2019.01) |

(52) U.S. Cl.
CPC ........ *G06F 16/248* (2019.01); *G06F 16/2365* (2019.01); *G06F 16/243* (2019.01); *G06F 16/24542* (2019.01); *G06F 16/2455* (2019.01)

(58) Field of Classification Search
CPC .. G06F 16/248; G06F 16/243; G06F 16/2365; G06F 16/2455; G06F 16/24542
See application file for complete search history.

(56) References Cited

U.S. PATENT DOCUMENTS

| | | | |
|---|---|---|---|
| 2023/0259692 A1* | 8/2023 | Wright | .................... G06F 40/56 704/9 |
| 2024/0086648 A1* | 3/2024 | Han | ...................... G06F 40/166 |

* cited by examiner

*Primary Examiner* — Etienne P Leroux
(74) *Attorney, Agent, or Firm* — Calfee, Halter & Griswold LLP

(57) ABSTRACT

A computing system includes a processor and memory storing instructions that, when executed by the processor, cause the processor to perform acts. The acts include receiving a query provided by a user. The acts additionally include determining that the query is related to a comparison between entities. Based upon the determining that the query is related to the comparison between entities, the computing system generates a prompt that is to be input to a generative language model, where the prompt includes: 1) an instruction for the generative language model to generate a table based upon the query; and 2) attribute values for entities identified by a search system based upon the query. The acts also include providing the prompt as input to the generative language model, where the generative language model generates a table based upon the prompt, and further where the table includes the attribute values for the entities.

20 Claims, 9 Drawing Sheets

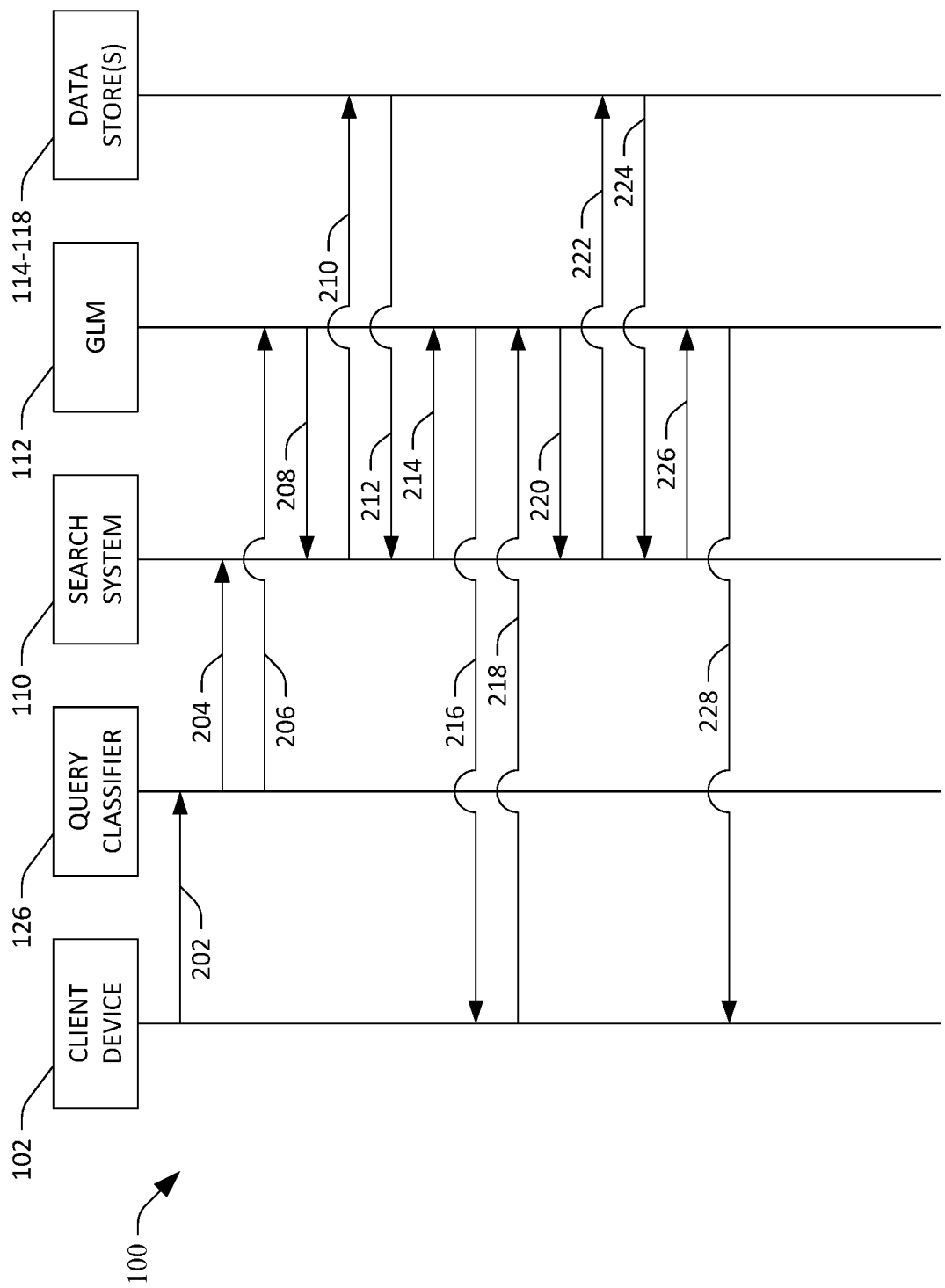

TEXT ENTRY FIELD — 306

EXPLORE BY USE CASE  316
[USE CASE 1] [USE CASE 2] ••• [USE CASE M]

DROP DOWN MENU — 314          ▽ — 310

| Source  | Image   | Title                         | Insight                                                        | Material              | Type              | Brand    | Size | Comfort | Fit |
|---------|---------|-------------------------------|----------------------------------------------------------------|-----------------------|-------------------|----------|------|---------|-----|
| Store 1 | Image 1 | Sport Bike Jersey             | Windproof and water-resistant fabric for your protection       | 100% recycled polyester | Bike Jersey       | Brand 1  | XL   | 5       | 4   |
| Store 2 | Image 2 | Thermal Cycling Jersey        | Thermal fabric to keep you warm in cooler temperatures         | 100% polyester        | Cycling Jersey    | Brand 2  | M    | 4       | 5   |
| •••     | •••     | •••                           | •••                                                            | •••                   | •••               | •••      | •••  | •••     | ••• |
| Store N | Image N | Men's Motion Shorts (Black)   | Comprehensive fabric for muscle support and improved performance | Synthetic           | Cycling Shorts    | Brand N  | 2X   | 5       | 5   |

312

View Product Specs — 320
Attribute — 318
☑ Material
☑ Type
☑ Brand
☐ Size
☐ Color
☐ Gender
☐ Age Group
☐ Country
☐ Warranty
•••

View Ratings — 324
Aspect — 322
☑ Comfort
☑ Fit
☐ Quality
•••

FIG. 3

COMPUTER-IMPLEMENTED TABLE CONSTRUCTION

RELATED APPLICATION

This application claims priority to Indian Patent Application No. 202311029408, filed on Apr. 24, 2023. The entirety of this application is incorporated herein by reference.

BACKGROUND

Relatively recently, generative language models (GLMs) (also referred to as large language models (LLMs)) have been developed. An example of a GLM is the Generative Pre-trained Transformer 4 (GPT-4) model. Another example is a Language Model for Dialogue Applications (LaMDA). Yet another example of a GLM is the BigScience Large Open-science Open-access Multilingual Language model (BLOOM). Briefly, a GLM is configured to generate an output (such as text in human language, source code, music, video, and the like) based upon a prompt set forth by a user and in near real-time (e.g., within a few seconds of receiving the prompt). The GLM generates content based upon training data over which the GLM has been trained.

Conventional GLMs are "turn based", meaning that the user enters a query, the GLM responds in a conversational style, the user responds to the GLM, and so on back and forth. However, as the user enters additional queries or provides additional clarifying information to refine the results provided by the GLM, the GLM does not retain key constraints that were specified in previous turns and thus the results provided become less relevant. This results in the user having to re-specify the constrains during the conversation.

Put another way, conventional GLMs struggle to retain key constraints specified by the user in previous conversation turns, resulting in the user having to re-specify the constraints. For instance, when a user requests a list of products (e.g., top five camping tents under $500, or the like), the returned list eventually disappears from view on the user interface as the user continues the conversation and more recent conversation turns populate the user interface. This results in the user having to scroll up and down to compare the most recently returned information with the original list and/or images, which is cumbersome and inefficient. Accordingly, conventional GLMs are deficient with respect to identifying, generating, and/or displaying appropriate information in an efficient manner in response to certain types of user input.

SUMMARY

The following is a brief summary of subject matter that is described in greater detail herein. This summary is not intended to be limiting as to the scope of the claims.

Various technologies are described herein that relate to providing a chat-based conversational interface for users to research topics, as well as to perform tasks such as research entities, compare entities, etc. Despite the power of GLMs, the current GLM-based representations of products in conversational chats produced through use of GLMs are not optimized for tasks that involve comparison of entities. The herein described systems and methods facilitate providing a conversational chat-based interface that includes a table that includes cells that comprise content, where the table is constructed by the GLM. For instance, a table can include attributes of entities presented for sake of comparison, images of entities, amongst other information.

According to one aspect, at runtime, user queries that indicate an intent to compare entities are identified, e.g., using a classifier or the like. For instance, if a user submits a query such as "I need a lawn tractor under $2000", such a query can be classified or otherwise identified as a query where a comparison is to be performed (e.g., the user wishes to compare multiple lawn tractors). The described systems and methods facilitate generating a conversational reply to the user with information arranged in a tabular format so that the user is able to consume the data as well as interact with the data by, e.g., sorting the displayed table according to different attributes; selecting which attributes to use to compare the products in the table; engaging with the different entities in the table; adding and/or removing entities from the table, wherein the addition of an entity can cause the GLM to generate a new query that produces information about other entities that can be added to the table, etc.

The foregoing presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2 is a communications diagram that depicts flow of communications between computing systems.

FIG. 3 shows a schematic that depicts a graphical user interface (GUI) on a client computing device.

DETAILED DESCRIPTION

Figure 1:
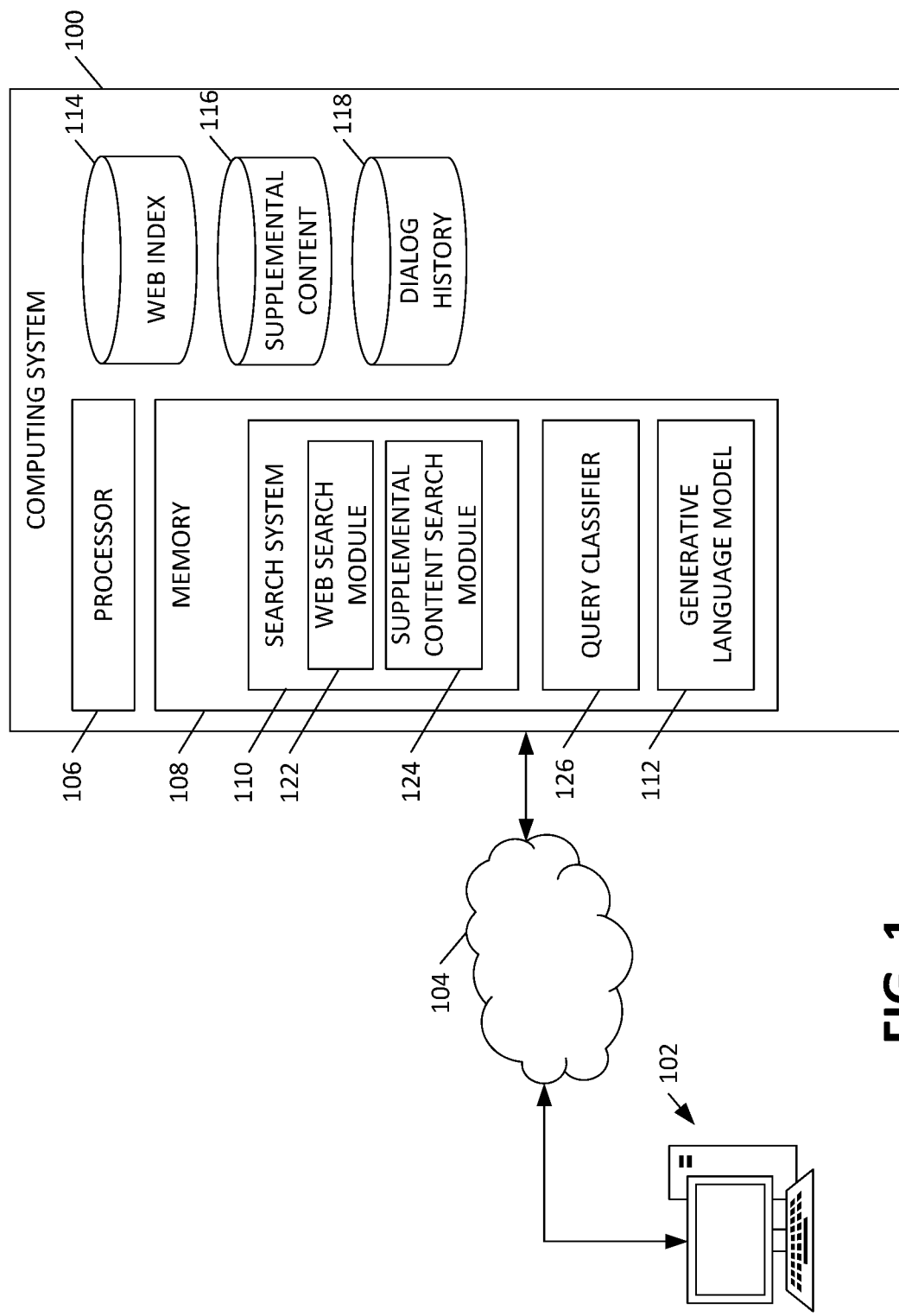
FIG. 1 shows a functional block diagram of a computing system.

Various technologies pertaining to providing entity information in an interactive and adaptable tabular format on a computing device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality described as being carried out by certain system components may be performed by multiple components. Similarly, for instance, a component may be configured to perform functionality described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

The described systems and methods overcome various deficiencies associated with conventional GLMs. For instance, conventional GLMs, due to limits on sizes of prompts used by GLMs to generate outputs, may fail to retain constraints specified by the user in previous conversation turns, resulting in the user having to re-specify the constraints. Additionally, due to limitations in display screen real-estate, when a user requests a list of comparable entities (e.g., top 3 lawn mowers under $300, or the like), the returned list eventually disappears from view as the user continues the conversation and more recent conversation turns populate the user interface. This results in the GLM being requested to regenerate information that has already been generated and/or computing resources being employed as the user scrolls up and down to compare the most recently returned information with the original list and/or images. Described herein are various technologies that facilitate generating and displaying a persistently located and customizable tabular output responsive to a user query using a GLM.

Referring now to FIG. 1, a functional block diagram of a computing system 100 is illustrated. While illustrated as a single system, it is to be understood that the computing system 100 can include several different server computing devices, can be distributed across data centers, etc. The computing system 100 is configured to obtain information based upon a query set forth by a user and is further configured to provide the obtained information as a portion of a prompt to a GLM.

A client computing device 102 operated by a user (not shown) is in communication with the computing system 100 by way of a network 104. The client computing device 102 can be any suitable type of client computing device, such as a desktop computer, a laptop computer, a tablet (slate) computing device, a video game system, a virtual reality or augmented reality computing system, a mobile telephone, a smartphone, a smart speaker, or other suitable computing device.

The computing system 100 includes a processor 106 and memory 108, where the memory 108 includes instructions that are executed by the processor 106. More specifically, the memory 108 includes a search system 110 and a GLM 112, where operations of the GLM 112 are described in greater detail below. The computing system 106 also includes data stores 114-120, where the data stores 114-120 store data that is accessed by the search system 110 and/or the 112. With more particularity, the data stores 114-120 include a web index 114, supplemental content data store 116, and a dialog history data store 118. The web index data store 114 includes a web index that indexes webpages by keywords included in or associated with the webpages. The supplemental content data store 116 includes supplemental content (e.g., advertisements or other related content) that can be returned by the search engine 110 based upon a query.

The dialog history data store 118 includes dialog history, where the dialog history includes dialog information with respect to users and the GLM 112. For instance, the dialog history can include, for a user, identities of conversations undertaken between the user and the GLM 112, input provided to the GLM 112 by the user for multiple dialog turns during the conversation, responses in the conversation generated by the GLM 112 in response to the inputs from the user, queries generated by the GLM during the conversation that are used by the GLM 112 to generate responses, and so forth. In addition, the dialog history can include context obtained by the search engine 110 during conversations; for instance, with respect to a conversation, the dialog history 118 can include content generated based upon queries set forth by the user (and/or other users) and/or the GLM 112 during the conversation, content from webpages identified by the search engine 110 based upon queries set forth by the user and/or the GLM 112 during the conversation, and so forth.

A dialog history data store 118, therefore, stores information related to previous user interactions with the GLM 112, including information harvested from dialog histories between the GLM 112 and one or more users. For example, when a user initiates a search with a query that pertains to a comparison between entities, and then continues to interact with the GLM in a chat to specify important attributes of the entities for which the user is searching, such attributes can be associated with the given product as being important attributes of the product. For a given product, attributes that are more frequently queried can be assigned greater weight or otherwise be more highly ranked then less frequently queried attributes. Attributes with higher weights can be selected by the GLM for inclusion in a product comparison table over attributes having lower weights.

The data stores 114-118 are presented to show a representative sample of types of data that are accessible to the search engine 110 and/or the GLM 112; it is to be understood that there are many other sources of data that are accessible to the search engine 110 and/or the GLM 112, such as data stores that include real-time finance information, data stores that include real-time weather information, data stores that include real-time sports information, data stores that include images, data stores that include videos, data stores that include maps, etc. Such sources of information are available to the search engine 110 and/or the GLM 112.

The search engine 110 includes a web search module 122 and a supplemental content search module 124. The web search module 122 is configured to search the web index data store 114 based upon queries received by users, queries generated by the search engine 110 based upon queries received by users, and/or queries generated by the GLM 112 based upon interactions of users with the GLM 112. Similarly, the supplemental content search module 124 is configured to search the supplemental content data store 116 based upon queries received by users, queries generated by the search engine 110 based upon queries received by users, and/or queries generated by the GLM 112 based upon interactions of users with the GLM 112.

As discussed above, operation of the search engine 110 is improved based upon the GLM 112, and operation of the GLM 112 is improved based upon the search engine 110. For instance, the search engine 110 is able to provide outputs that the search engine 110 was not previously able to provide (e.g., based upon outputs generated by the GLM 112), and the GLM 112 is improved by using information obtained by the search engine 110 to generate outputs (e.g., information identified by the search engine 110 can be included as a portion of a prompt used by the GLM 112 to generate outputs). Specifically, the GLM 112 generates results based upon information obtained by the search engine 110 that have a higher likelihood of being accurate when compared to results generated by GLMs 112 that are not based upon such information, as the search engine 110 is associated with years of design to curate information sources to ensure accuracy thereof.

The memory also includes a query classifier 126 that assigns an intent to a query received by the search system 110 and/or GLM 112. For example, the query classifier 126 can classify a received query as one that is associated with an intent of comparing entities (and/or values of attributes of the entities). An example query that is associated with an intent of comparing entities is "new car under $30,000". As will be described in greater detail below, upon the query classifier 126 classifying a received query as one that is associated with an intent of comparing entities, the query classifier 126 (or other module of the computing system 100) can provide the GLM 112 with an updated prompt that instructs the GLM 112 to generate a table and populate the table with values of attributes of entities that are relevant to the query, images that are relevant to the query, and so forth. Further, the query classifier 126 can include instructions in the prompt that cause the GLM 112 to provide interactive graphics that represent ways in which the table can be modified, such as identities of attributes not represented in the table (e.g., due to screen size constraints), entities not represented in the table (e.g., due to screen size constraints), and so forth. Thus, based upon the prompt, the GLM 112 can generate and display a table showing multiple entities meeting the criterion and values of attributes of those entities. The user can then provide additional interaction with respect to the interactive graphic elements, causing the GLM 112 to present an updated table (e.g., with additional values of attributes included, with values for attributes removed, and so forth). Still further, the GLM 112 can update a table based upon further queries from the user, such as "I want it to be a hybrid SUV." In this example, the GLM 112 updates the table to exclude vehicles that are not hybrid SUVs (and have a cost under $30,000). Operation of the GLM 112 is described in further detail below.

FIG. 2 is a communications diagram that depicts communications exchanged between the client computing device 102, the query classifier 126, the search system 112, the GLM 126, and the data store(s) 114-118. While a certain order of communications is illustrated, it is to be understood that some communications may be omitted and/or communications may occur in an order that differs from what is shown. Moreover, communications can be added to those shown in FIG. 2.

In more detail, at 202, a query submitted to the client computing device 102 by a user thereof is obtained by the query classifier 126. In an example, the query is "new tennis racket". The query classifier 126, based upon the query, assigns a classification to the query that indicates that an intent associated with the query is comparison between entities. The query classifier 126 can optionally classify the query as being associated with multiple intents; for instance, the query classifier 126 can assign a classification that indicates that an intent associated with the query is a comparison between entities and can assign a second classification that indicates that an intent associated with the query is to purchase a product.

At 204, the query classifier 126 provides the query and the intent(s) identified by the query classifier 126 as being associated with the query to the search system 110. Further, at 206, the query classifier 126 provides the query and prompt information assigned to the intent(s) to the GLM 112. The prompt information may include an instruction to the GLM 112 that the GLM 112 is to generate a table and populate the table with attributes of entities identified by the search system 110 and provided to the GLM 112 by the search system 110. Further, the prompt information can include instructions to the GLM 112 to generate interactive graphical elements that can be interacted with to allow for relatively quick modification of content of a table constructed by the GLM 112. Examples are presented below.

The GLM 112 can also generate additional queries based upon the query received by the query classifier 126 and optionally further based upon other information, such as the intent(s) assigned to the query by the query classifier 126, information in a profile of the user, historical dialog with the user, and so forth. Such queries are constructed by the GLM 112 to assist the search system 110 with finding relevant information with respect to the query submitted by the user.

At 208, the GLM 112 provides the generated queries to the search system 110. At 210, the search system 110 searches the data store(s) 114-118 based upon the queries (where the queries include the query submitted by the user, the queries generated by the GLM 112, and optionally suggested queries constructed by the search system 110). At 212, the search system 110 obtains search results identified in the data store(s) 114-118, where the search results can include webpages identified as being relevant to the query, supplemental content (e.g., product descriptions in a product catalog), and/or other information. At 214, the search system 110 provides at least some information from the search results to the GLM 112. Such information can include portions of webpages identified by the search system 110 as being relevant to a query in the queries, entity information from a knowledge graph, product information from a product catalog, and so forth.

The GLM 112 generates a table and optionally other graphical content based upon the prompt information received from the query classifier 126 at 206 and further based upon the information provided to the GLM 112 by the search system. Continuing with the example query "new tennis racket", based upon the prompt information received from the query classifier 126 and the information received from the search system 110, the GLM 112 generates a table that includes identities of multiple tennis rackets and values of attributes associated with such tennis rackets (where example attributes are "brand", "weight", "length", "material", "flex", "price", and so forth). The GLM 112 can further optionally include images of rackets in the table, videos pertaining to the rackets in the table, and so forth.

At 216, the GLM 112 provides the client device 102 with the generated table, where the table can be presented in a chat interface of the GLM 112, in a search engine results page (SERP) associated with the search system 110, and so forth. As indicated above, the GLM 112 can also generate interactive graphical elements to present with the table, where interaction with such elements by the user who submitted the query can cause contents of the table to be updated. For instance, a pulldown button can be presented by an attribute identifier, and selection of such pulldown menu can result in a list of attributes associated with the table to be presented (with attributes already presented checked or highlighted in such way). The user can interact with such list to cause attributes represented in the table to be updated. In another example, a pulldown button is presented in graphical relation to an entity name, where a list of entities that correspond to the query are presented upon user selection of such pulldown button. Through interaction with such list, the user can alter the entities that are represented in the table.

Upon reviewing the table, the user of the client computing device 102 may wish to modify content of the table. For instance, the user may wish to update the table to add values for an attribute, to remove values for an attribute, and so forth. The user can request such modifications through interaction with the interactive graphical elements constructed by the GLM 112 or through further natural language input. At 218, the client computing device 102 provides the GLM 112 with user instructions, where the user input instructions are based upon user input set forth to the client computing device 102 by the user. When the GLM 112 is already in possession of information that satisfies the user input instructions, the GLM 112 can update the table. For instance, the GLM 112 can be provided with attribute values in the information received from the search system 110 at 214; however, values for an attribute may not be presented in the table due to lack of screen real estate. Hence, when the user requests that the table be updated to represent values for the attribute, no additional searching need be performed; instead, the GLM 112 can update the table based upon such user input. When, however, the GLM 112 is not in possession of information requested from the user, the GLM 112 can initiate a new search by the search system 110 at 220. For instance, the GLM 112 receives a query at 218, such as "which ones are best on clay courts". In response to receipt of such query, the GLM 112 generates additional queries (as described above) and provides the received query and the additional queries to the search system at 220.

At 222, the search system 110 searches the data store(s) 114-118 based upon the queries received from the GLM 112, and at 224 the search system 110 obtains search results based upon the searches. At 226, the search system 110 provides information extracted from the search results to the GLM 112. The GLM 112 generates an updated table based upon such information and returns the updated information to the client computing device 102.

The system 100 is particularly-well suited for scenarios where a user is obtaining information for comparison when deciding whether to purchase a product or service; accordingly, the system 100 is particularly well-suited for use in connection with retail websites or platforms that offer products for acquisition. Hence, attribute values included in a table can be product ratings, user reviews, images of products, videos of products, and so forth.

The communications diagram 200 illustrates various advantages of the computing system 100 over conventional search systems and/or GLMs. With respect to a conventional GLM, such GLM is not configured to generate outputs based upon information obtained from search results identified by a search system. Hence, upon receiving the query "new tennis racket", the conventional GLM is unable to generate output that includes attribute values for tennis rackets that are not represented in training data that is used to train the conventional GLM. Further, conventional GLMs are not configured to generate a table without explicit instructions set forth by the user to do so. Hence, upon receipt of a query "new tennis racket", the conventional GLM generates natural language output but fails to provide information in tabular form that can be used to compare attributes of different entities that may be of interest to the user. The system 100 improves upon conventional search systems by allowing for interaction with respect to a table; when a conventional search engine returns a table based upon the query, the conventional search engine does not provide the user with any mechanism for updating the table based upon further user interaction.

Moreover, rather than being configured to present only attribute values identified by the search system 110 in a table, the prompt provided to the GLM 112 by the query classifier 126 and/or the search system 110 can construct the GLM 112 to generate contents of table cells in natural language; example contents can include "pros" and "cons" of a product, a summary of user reviews of a product, amongst other information.

Referring now to FIG. 3, a schematic that depicts a GUI 300 on a client computing device (e.g., the client computing device 102 of FIG. 1) is illustrated. For instance, the GUI 300 can pertain to a web browser or other application that is configured to interface with the GLM 112 and/or the search system 110. The GUI 300 includes a text entry field 306 that is configured to receive a query set forth by the user of the client computing device 102.

Upon the text entry field 306 being selected (by way of a mouse, keyboard strokes, touch sensitive display, voice command, gesture, etc.), the text entry field 308 is activated to receive textual input.

A pointer 310 can be employed in connection with selecting graphical elements displayed in the GUI 300, where position of the pointer 310 is based upon a corresponding position of a mouse, position of the gaze of a user relative to the display, position of a digit on a touch-sensitive display, etc. In one example, the text entry field 306 is selectable through use of the pointer 310.

Also illustrated is a table 312 of product information that has been generated by the GLM 112 in response to a user query. In the illustrated example, the query is related to biking apparel. As illustrated, the table shows a plurality of images of products 1-N, where N is an integer, for products 1-N. Also shown is a "source" column, where the source (e.g., store, vendor, etc.) of each product is displayed. A "title" column lists each product by its respective name.

An "insight" column shows insightful description of each product 1-N, the description being generated by the GLM 112 based upon information provided thereto by the search system 110. Attribute columns for material, type, brand, and size of the products 1-N are provided. Additionally, ratings columns are shown for comfort and fit ratings for each product 1-N. It will be appreciated that the particular pieces of information shown for each product 1-N are presented by way of example only, and that the examples of tables described herein may include any desired pieces of information.

The GUI 300 further includes a drop-down menu 314, which the user can select to drop down a list of the displayed products 1-N. The user can then select a specific product to view additional information therefor. It will be appreciated that the drop-down menu is not limited to being drop-down, but rather may be a slide-out (left or right) menu or a pop-up menu. In another embodiment, the image thumbnails and/or the product titles/names are selectable by the user in order to view additional information. In yet another embodiment, the user can click anywhere on the row describing a particular product to view additional information about that product. In other embodiments, the user can hover the pointer 310 over a particular image, title, and/or row to view additional information about the product.

Also illustrated are a plurality of selectable "use case" buttons (1–M) 316 that can be selected by the user to refine the table 312. A "use case" can be generated by the GLM 112 based upon information about the products provided to the GLM 112 by the search system 110. A product specifications window 318 is shown and comprises a plurality of selectable product attributes that the user can specify for presentation in the table 312. The product specifications window also comprises a text field 320 into which the user can enter the custom attribute name for display in the table 312.

A ratings window 322 is provided and comprises selectable aspects of the product for which purchasers have rated the product. The user can specify which aspects should be shown in the table 312. Also provided is a text field 324 into which the user can enter a custom aspect for which the user desires to see ratings.

In one embodiment the GUI 300 further comprises one or more slider bars (not shown due to space constraints) that the user may manipulate to scroll up or down and/or left or right on the screen.

Figure 4:
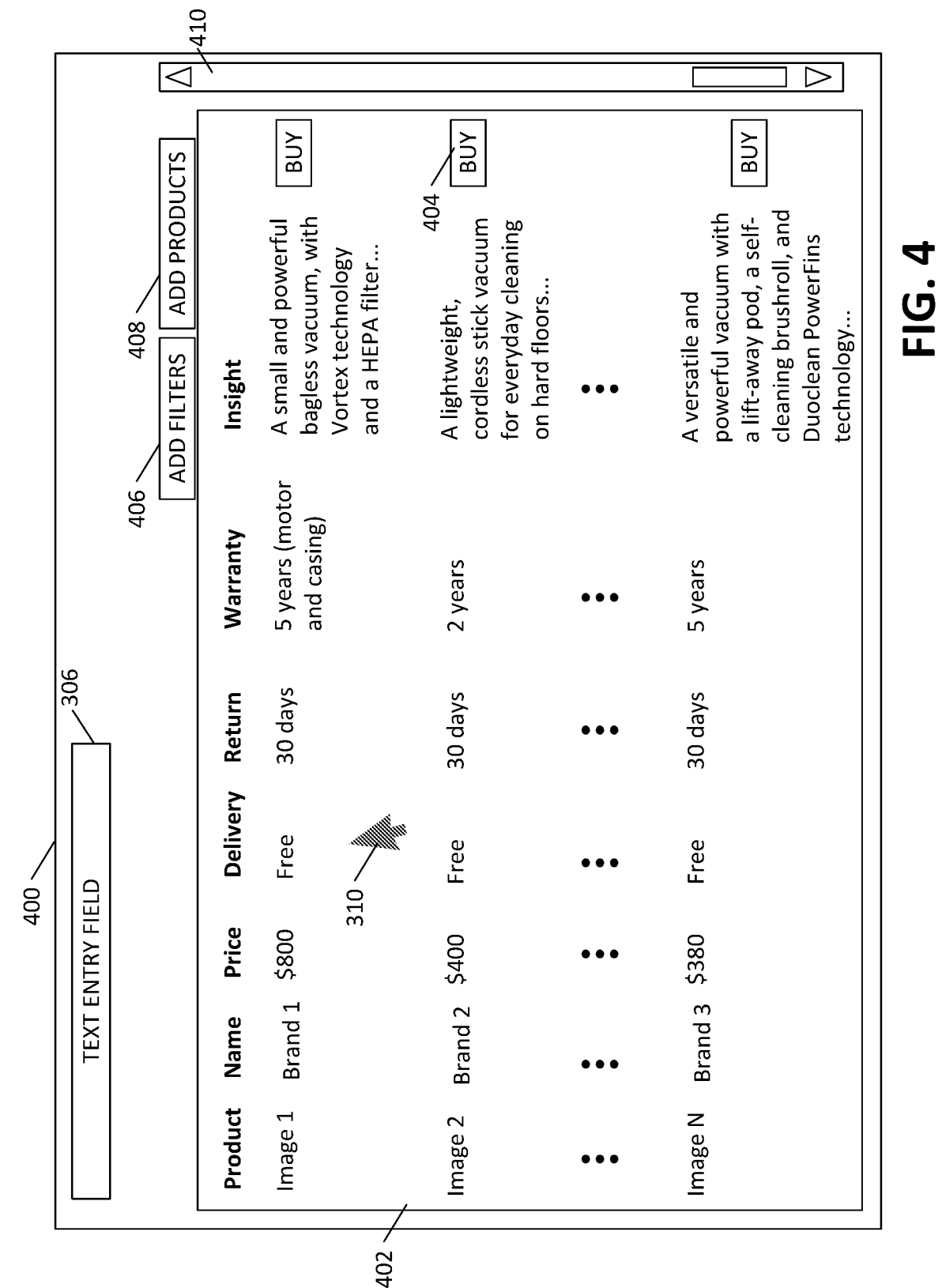
FIG. 4 shows a schematic that depicts another example of a GUI on a client computing device.

Turning now to FIG. 4, a schematic that depicts a GUI 400 presented on a client computing device (e.g., the client computing device 102 of FIG. 1) is illustrated. The GUI 400 shows an additional way of presenting product information in a tabular manner and permitting user customization of the information presented in the table.

The GUI includes a table 402 of product information that has been generated by the GLM 112 based upon the user query and further based upon information provided to the GLM 112 by the search system 110 and/or the query classifier 126. In the illustrated example, the query is related to vacuum cleaners. As illustrated, the table shows a plurality of images of products 1–N, where N is an integer, for products 1–N. Also shown is a Source column, where the source (e.g., store, vendor, etc.) of each product is displayed. A Title column lists each product by its respective name.

The table 402 comprises rows and columns of information, wherein each row provides information regarding one of the products 1–N, and each column provides a particular piece of information about the products. As illustrated, columns are provided for product images for products 1–N, product name, product price, delivery or shipping cost, return period, warranty details, and insightful text generated by the GLM 112. A "buy" (or "purchase" or "purchase options", etc.) button 404 is provided for each of the products 1–N, and the user can click on or otherwise select the buy button 404 in order to see purchase options for a given one of the products 1–N, as shown in FIG. 5.

Figure 6:
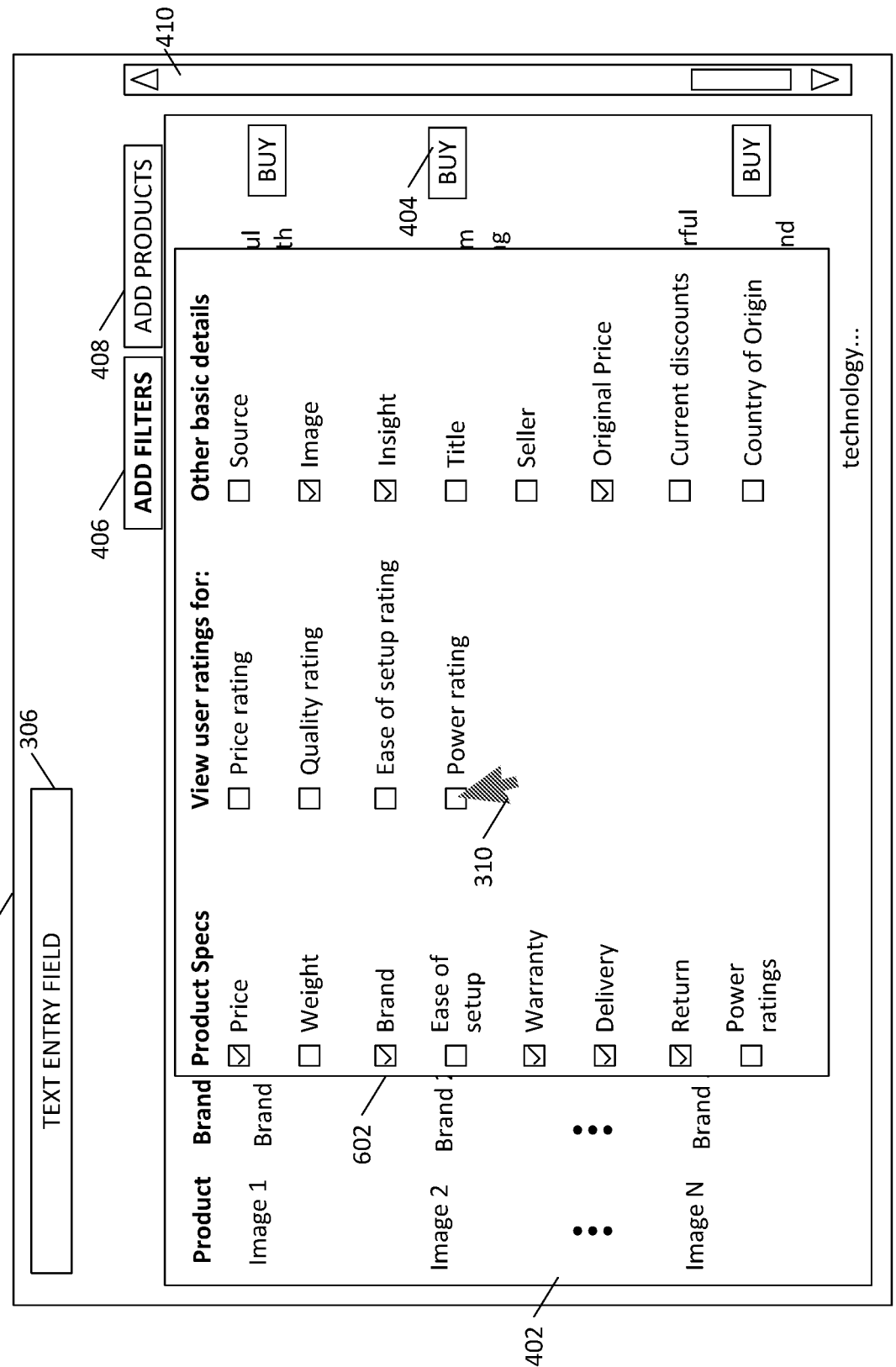
FIG. 6 shows a schematic that depicts a GUI, where a user has selected an "add filters" tab.
Figure 7:
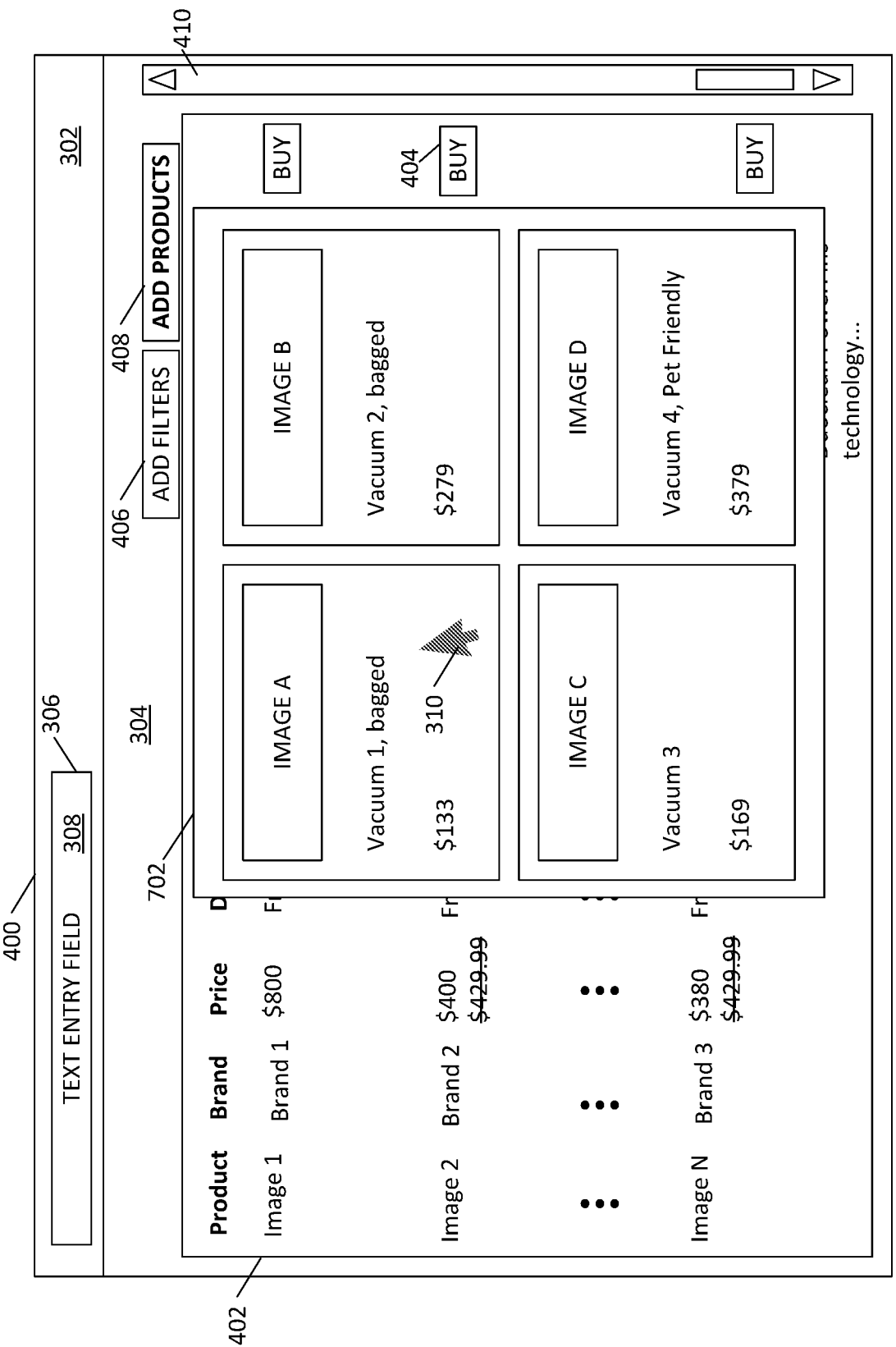
FIG. 7 shows a schematic that depicts a GUI, wherein a user has selected an "add products" tab.

An "add filters" tab 406 is provided. When the tab 402 is selected, a pop-up window is opened via which the user can select additional pieces of product information for inclusion in the table as shown in FIG. 6. An "add products" tab 408 is also provided. When the tab 408 is selected, a pop-up window is opened via which the user can select additional related products for inclusion in the table as shown in FIG. 7.

Figure 5:
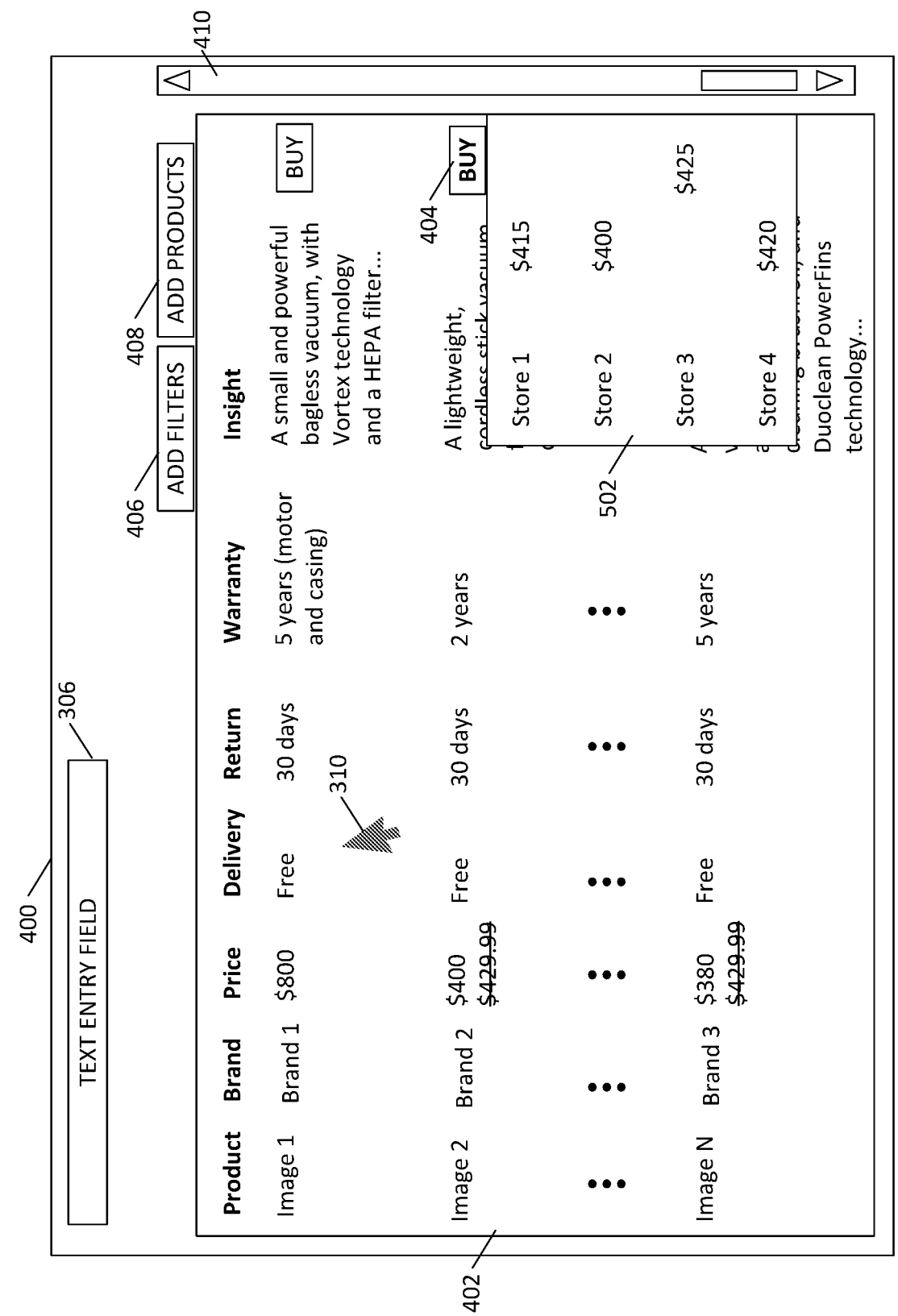
FIG. 5 shows a schematic that depicts a GUI, where a user has selected a "buy" (or "purchase") button.

Referring more specifically to FIG. 5, a schematic that depicts the GUI 400 is illustrated, wherein the user has selected the "buy" (or "purchase") button 404

The GUI includes the table 402 of product information that has been generated by the GLM 112, the "buy" (or "purchase") button 404, the "add filters" tab 406, the "add products" tab 408, and the slider bar 410 for scrolling up or down on the screen of the computing device on which the GUI 400 is presented. A horizontal slider bar (not shown due to space constraints) may also be provided for scrolling left or right on the screen.

In the illustrated example, the user has selected the "buy" button 404 for the second product in the table ("Brand 1" in the illustrated example). When the user selects the "buy" button 404, a pop-up menu 502 generated by the GLM 112 is presented to the user. The pop-up menu 502 presents to the user one or more stores or vendors from which the user may buy the product corresponding to the selected "buy" button 404. In the illustrated example, the pop-up menu 502 presents four different stores from which the user may purchase the selected product. Store 2 has a price of $400, which corresponds to the best price for the selected product, which is displayed in the price column of the table 402 for the selected product.

Turning now to FIG. 6, a schematic that depicts the GUI 400 is illustrated, wherein the user has selected the "add filters" tab 406. The GUI includes the table 402 of product information that has been generated by the GLM 112, the "buy" (or "purchase") button 404, the "add filters" tab 406, the "add products" tab 408, and the slider bar 410 for scrolling up or down on the screen of the computing device on which the GUI 400 is presented. A horizontal slider bar (not shown due to space constraints) may also be provided for scrolling left or right on the screen.

When the user selects the "add filters" button 406, a pop-up menu 602 generated by the GLM 112 is presented to the user comprising features, attributes, ratings, details, etc. that the user may select to customize the table 402. In the illustrated example, the menu 602 presents a list of product specifications that may be selected, including price, weight, brand, ease of setup, warranty, and delivery, return period, power rating, or the like. The menu 602 also provides a list of ratings that may be selected by the user, including a price rating, a quality rating, an ease-of-setup rating, and power rating, etc. Additionally, the menu 602 presents a list of other basic details from which the user may select, including the product source (e.g., manufacturer), a product image, insightful commentary generated by the GLM of FIG. 1, product title or name, product seller (e.g., store or vendor, etc.), original price of the product, current coupons or discounts for the product, country of origin, etc.

It will be understood that the menu 602 is not limited to the particular categories of additional information (e.g., product specifications, user ratings, and other basic details), but rather may include any suitable and/or desired selectable options. In one embodiment, the categories of additional features that can be selected in the filter menu 602 is determined by the GLM 112, which selects the attributes based upon information provided thereto by the search system 110.

Turning now to FIG. 7, a schematic that depicts the GUI 400 illustrated, wherein the user has selected the "add products" tab 408. When the user selects the "add products" button 408, a pop-up menu 702 generated by the GLM 112 is presented to the user comprising information describing additional products that the user may select for inclusion in the table 402. In the illustrated example, the menu 702 presents 4 additional products (e.g., image, product name, price, etc.). It will be understood that the menu 702 is not limited to 4 additional products, but rather may include any suitable and/or desired number of additional products.

Figure 8:
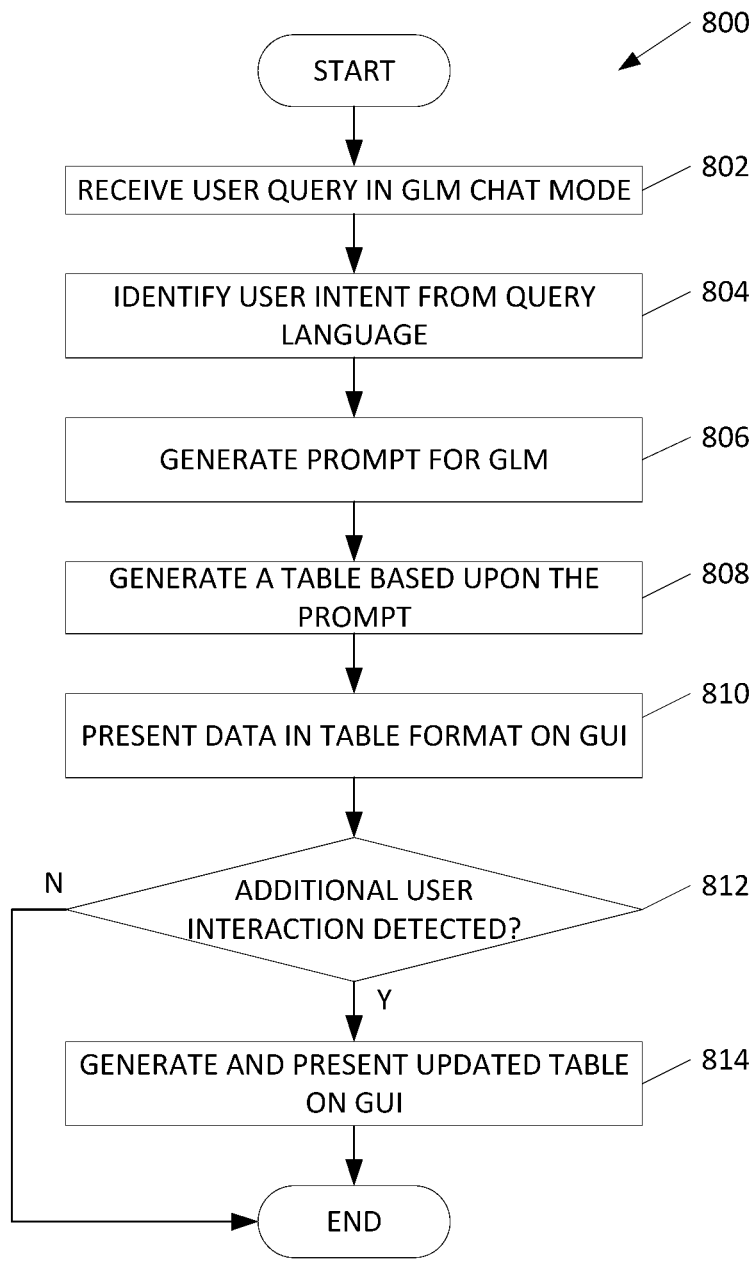
FIG. 8 illustrates a flow diagram depicting a method for providing product information in a configurable and modifiable tabular format.

FIG. 8 illustrates a methodology 800 relating to generating a table that includes attribute values for entities. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

At 802, the user query is received in GLM chat mode. At 804, user intent is identified from the query language. For instance, the user may ask "what is the best camping tent for under $500?" From this query it is deduced that the user intent is to shop for a camping tent. At 806 the system generates a prompt for the GLM. The prompt includes instructions and/or information that the GLM uses to generate a response for the user. As described above, the prompt includes the query, optionally other queries generated by the GLM, information extracted from search results retrieved by a search system based upon the received query and/or the queries generated by the GLM, and instructions to generate a table. At 808, the GLM generates a table based upon the prompt, where the table includes attribute values pertaining to products. At 810, the table is presented on a graphical user interface to facilitate user comparison.

At 812, a determination is made regarding whether additional user interaction has been detected. If no additional user interaction is detected at 812, then the method terminates. If additional user interaction is detected at 812, then at 814, the table is updated using the additional chat language, filters, user selected products, etc., and presented to the user on the GUI.

Figure 9:
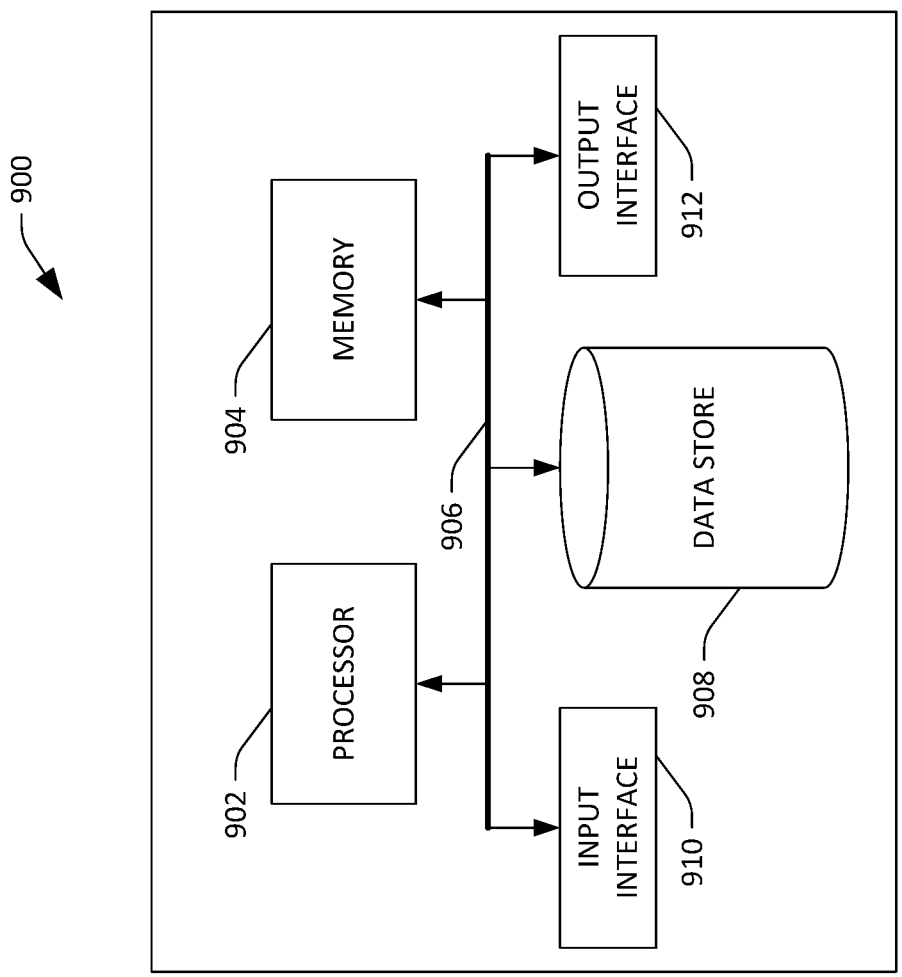
FIG. 9 is a high-level illustration of a computing device that can be used in accordance with the systems and methodologies disclosed herein.

Referring now to FIG. 9, a high-level illustration of an exemplary computing device 900 that can be used in accordance with the systems and methodologies disclosed herein is illustrated. For instance, the computing device 900 may be a client computing device that has an operating system stored thereon, where the operating system provides an interactive, adaptable, and persistently positioned product comparison functionality. By way of another example, the computing device 900 can be a server computing system that provides the product comparison functionality. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store content, graphical icons, profile information, etc.

The computing device 900 additionally includes a data store 908 that is accessible by the processor 902 by way of the system bus 906. The data store 908 may include executable instructions, graphical icons, profile information, content, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Various technologies that pertain to the examples set forth below have been described herein.

(A1) In an aspect, a method performed by a computing system includes receiving a query provided by a user and determining that the query is related to a comparison between entities. The method also includes generating a prompt that is to be input to a generative language model, where the prompt is generated based upon the determining that the query is related to the comparison between entities. The prompt includes an instruction for the generative language model to generate a table based upon the query. The prompt also includes attribute values for entities identified by a search system based upon the query. The method further includes providing the prompt as input to the generative language model, where the generative language model generates a table based upon the prompt, and further where the table includes the attribute values for the entities. The method additionally includes transmitting the table to a client computing device for presentment on a graphical user interface.

(A2) In some embodiments of the method of (A1), the method also includes receiving additional input from the user and updating the table based on the additional input.

(A3) In some embodiments of the method of (A2), the additional input includes an indication of an intended purpose of an entity in the entities.

(A4) In some embodiments of the method of at least one of (A2)-(A3), updating the table includes generating an additional prompt that includes the additional input. Updating the table also includes providing the additional prompt to the generative language model, where the generative language model updates the table based upon the additional prompt.

(A5) In some embodiments of the method of at least one of (A2)-(A4), the prompt includes second instructions to summarize user reviews of the entities, where summaries of the entities generated by the generative language model are included in the table.

(A6) In some embodiments of the method of at least one of (A2)-(A5), generating the prompt includes providing the search system with the query, where the search system identifies search results based upon the query. Generating the prompt also comprises including a portion of the search results in the prompt.

(A7) In some embodiments of the method of (A6), generating the prompt also includes providing the query to the generative language model, where the generative language model generates a second query based upon the query. Generating the prompt additionally includes providing the search system with the second query, where the search system identifies second search results based upon the query. Generating the prompt further comprises including a portion of the second search results in the prompt.

(B1) In another aspect, a computing system includes a processor and memory, where the memory stores instructions that, when executed by the processor, cause the processor to perform at least one of the methods disclosed herein (e.g., any of the methods of (A1)-(A7)).

(C1) In yet another aspect, a computer-readable storage medium includes computer-executable instructions that, when executed by a processor, cause the processor to perform at least one of the methods discloses herein (e.g., any of the methods of (A1)-(A7)).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
   a processor; and
   memory storing instructions that, when executed by the processor, cause the processor to perform acts comprising:
      receiving a query provided by a user;
      determining that the query is related to a comparison between entities;
      based upon the determining that the query is related to the comparison between entities, generating a prompt that is to be input to a generative language model, where the prompt includes:
         an instruction for the generative language model to generate a table based upon the query; and
         attribute values for entities identified by a search system based upon the query;
      providing the prompt as input to the generative language model, where the generative language model generates a table based upon the prompt, and further where the table includes the attribute values for the entities; and
      transmitting the table to a client computing device for presentment on a graphical user interface.

2. The computing system of claim 1, the acts further comprising:
   receiving additional input from the user; and
   updating the table based on the additional input.

3. The computing system of claim 2, wherein the additional input comprises an indication of an intended purpose of an entity in the entities.

4. The computing system of claim 2, wherein updating the table comprises:
   generating an additional prompt that includes the additional input;
   providing the additional prompt to the generative language model, wherein the generative language model updates the table based upon the additional prompt.

5. The computing system of claim 1, wherein the prompt includes second instructions to summarize user reviews of the entities, where summaries of the entities generated by the generative language model are included in the table.

6. The computing system of claim 1, wherein generating the prompt comprises:

providing the search system with the query, where the search system identifies search results based upon the query; and including a portion of the search results in the prompt.

7. The computing system of claim 6, wherein generating the prompt further comprising:

providing the query to the generative language model, where the generative language model generates a second query based upon the query;

providing the search system with the second query, where the search system identifies second search results based upon the query; and including a portion of the second search results in the prompt.

8. A method performed by a computing system, the method comprising:

receiving a query provided by a user;

determining that the query is related to a comparison between entities;

based upon the determining that the query is related to the comparison between entities, generating a prompt that is to be input to a generative language model, where the prompt includes:

an instruction for the generative language model to generate a table based upon the query; and attribute values for entities identified by a search system based upon the query;

providing the prompt as input to the generative language model, where the generative language model generates a table based upon the prompt, and further where the table includes the attribute values for the entities; and transmitting the table to a client computing device for presentment on a graphical user interface.

9. The method of claim 8, further comprising:

receiving additional input from the user; and updating the table based on the additional input.

10. The method of claim 9, wherein the additional input comprises an indication of an intended purpose of an entity in the entities.

11. The method of claim 9, wherein updating the table comprises:

generating an additional prompt that includes the additional input; and providing the additional prompt to the generative language model, wherein the generative language model updates the table based upon the additional prompt.

12. The method of claim 8, wherein the prompt includes second instructions to summarize user reviews of the entities, where summaries of the entities generated by the generative language model are included in the table.

13. The method of claim 8, wherein generating the prompt comprises:

providing the search system with the query, where the search system identifies search results based upon the query; and including a portion of the search results in the prompt.

14. The method of claim 13, wherein generating the prompt further comprising:

providing the query to the generative language model, where the generative language model generates a second query based upon the query;

providing the search system with the second query, where the search system identifies second search results based upon the query; and including a portion of the second search results in the prompt.

15. A computer-readable storage medium comprising instructions that, when executed by a processor, cause the processor to perform a comprising:

receiving a query provided by a user;

determining that the query is related to a comparison between entities;

based upon the determining that the query is related to the comparison between entities, generating a prompt that is to be input to a generative language model, where the prompt includes:

an instruction for the generative language model to generate a table based upon the query; and attribute values for entities identified by a search system based upon the query;

providing the prompt as input to the generative language model, where the generative language model generates a table based upon the prompt, and further where the table includes the attribute values for the entities; and transmitting the table to a client computing device for presentment on a graphical user interface.

16. The computer-readable storage medium of claim 15, further comprising:

receiving additional input from the user; and updating the table based on the additional input.

17. The computer-readable storage medium of claim 16, wherein the additional input comprises an indication of an intended purpose of an entity in the entities.

18. The computer-readable storage medium of claim of claim 16, wherein updating the table comprises:

generating an additional prompt that includes the additional input; and providing the additional prompt to the generative language model, wherein the generative language model updates the table based upon the additional prompt.

19. The computer-readable storage medium of claim of claim 15, wherein the prompt includes second instructions to summarize user reviews of the entities, where summaries of the entities generated by the generative language model are included in the table.

20. The computer-readable storage medium of claim of claim 15, wherein generating the prompt comprises:

providing the search system with the query, where the search system identifies search results based upon the query; and including a portion of the search results in the prompt.

* * * * *